July 28, 1942.   R. B. PLUMMER   2,291,103
SEWAGE APPARATUS
Filed May 18, 1938   2 Sheets-Sheet 1
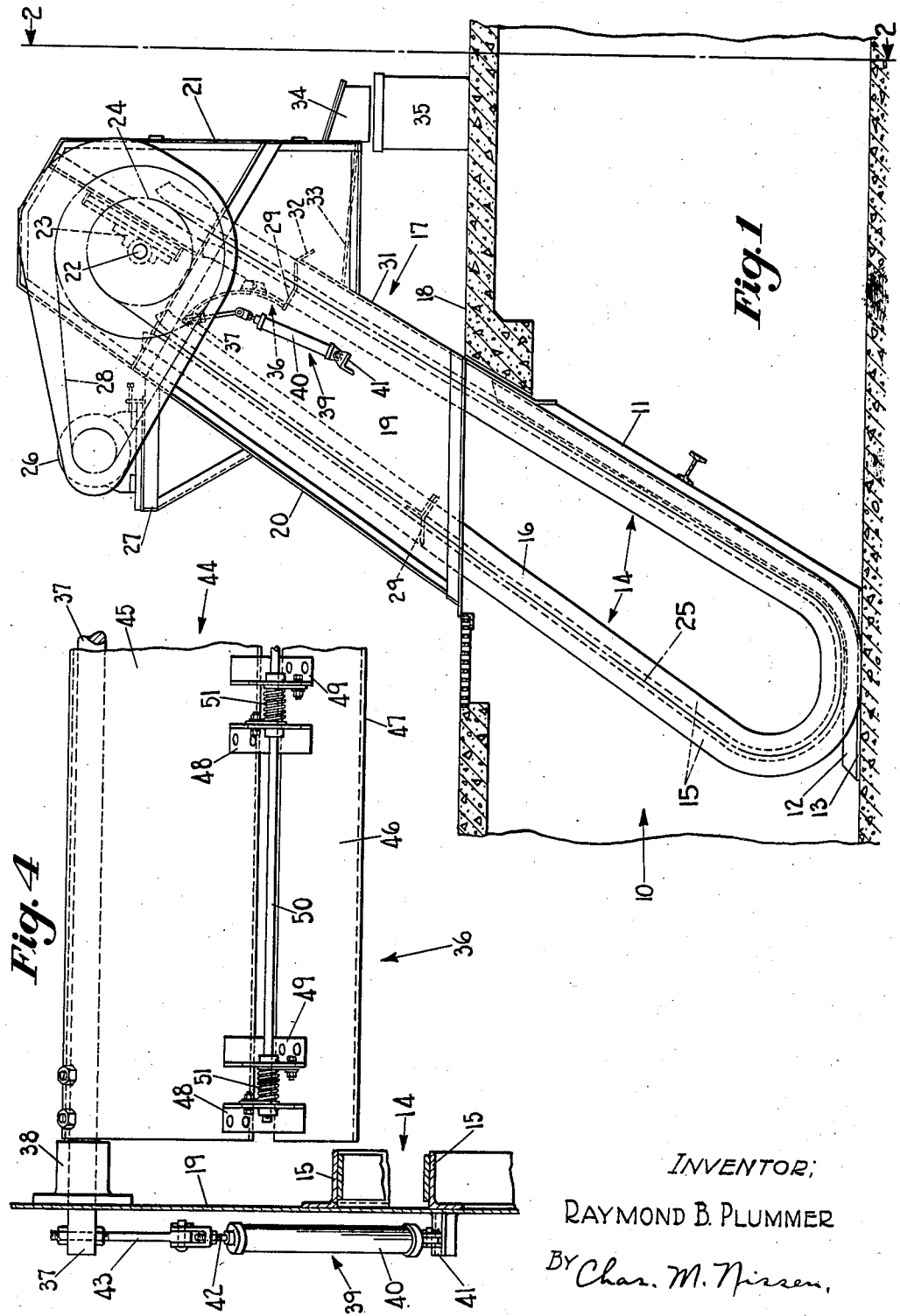
INVENTOR;
RAYMOND B. PLUMMER
BY Chas. M. Nissen.
ATT'Y.

July 28, 1942.  R. B. PLUMMER  2,291,103
SEWAGE APPARATUS
Filed May 18, 1938  2 Sheets-Sheet 2
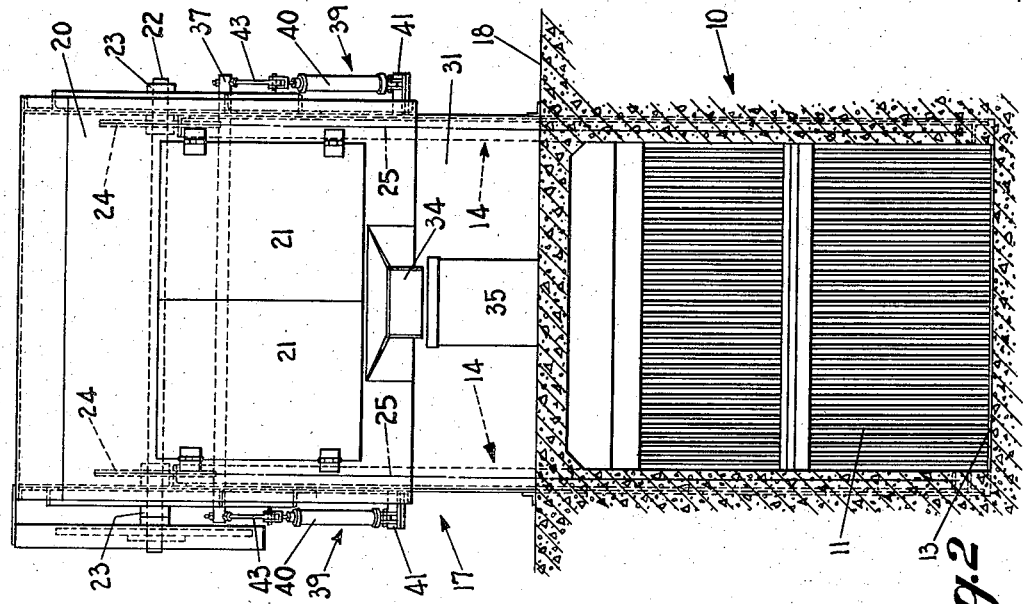
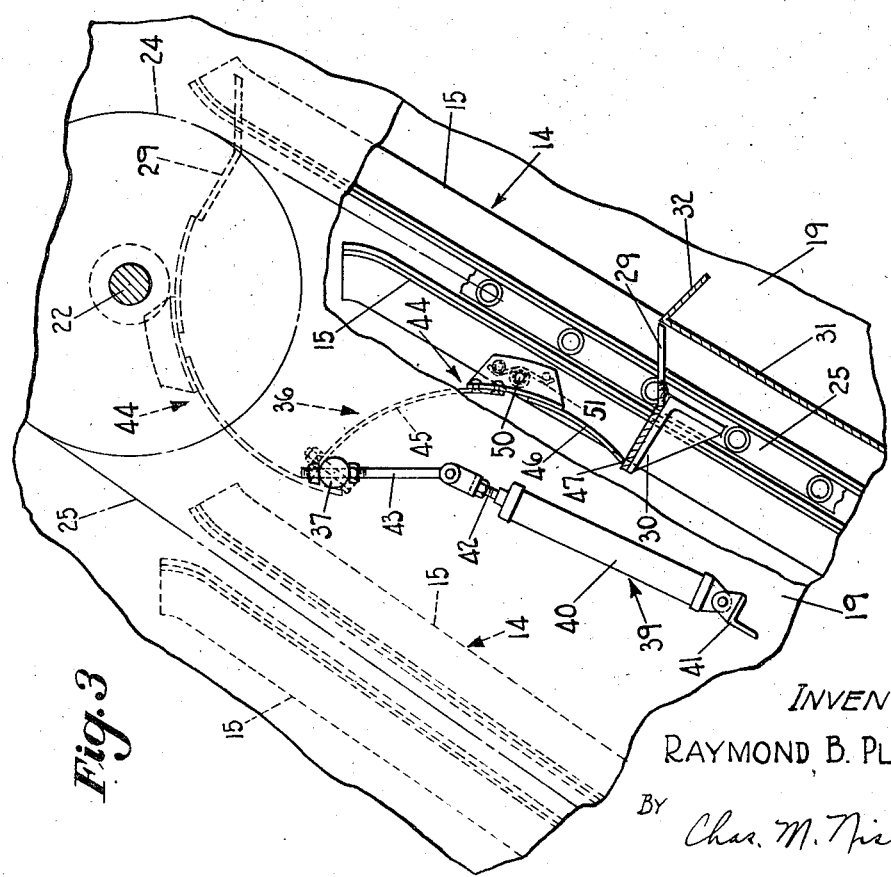
INVENTOR:
RAYMOND B. PLUMMER,
BY Chas. M. Nissen,
ATT'Y Patented July 28, 1942

2,291,103

UNITED STATES PATENT OFFICE 2,291,103

SEWAGE APPARATUS

Raymond B. Plummer, Indianapolis, Ind., assignor to The Jeffrey Manufacturing Company, a corporation of Ohio Application May 18, 1938, Serial No. 208,616

10 Claims. (Cl. 210—176)

This invention relates to sewage apparatus and particularly to a rake wiper or cleaning mechanism associated for cleaning a rake which is adapted to remove accumulated material from a stationary bar screen.

An object of the invention is to provide a simple but very efficient cleaning mechanism for a rake or flight which is advantageously positioned to obtain a device which is highly protected and small in size while at the same time being very efficient in operation.

Another object of the invention is to provide a rake or flight cleaning mechanism which will buckle in case its movement over a rake or flight is prevented, thus preventing damage to the apparatus.

Other objects of the invention will appear hereinafter, the novel features and combinations being set forth in the appended claims.

In the accompanying drawings:

Fig. 1 is a side elevational view of sewage apparatus comprising my invention;

Fig. 2 is a front elevational view taken on the line 2—2 of Fig. 1 looking in the direction of the arrows;

Fig. 3 is an enlarged side elevational view showing particularly the wiper mechanism with parts broken away to show certain details thereof more completely; and Fig. 4 is an enlarged detail end view showing a portion of the wiper mechanism with parts of the frame shown in section.

Referring particularly to Figs. 1 and 2 of the drawings, there is shown a sewage or water channel or sluiceway 10 preferably made as a monolith of poured concrete between the side walls of which is positioned an upwardly sloping bar screen 11, the bars of which have horizontally extending guide portions 12 at the screen bottom which rest upon a bottom plate 13 at the bottom of said channel 10.

Extending into the channel 10 and spaced along the opposite sides of the bar screen 11 adjacent to the side walls of said channel 10 is a pair of U-shaped chain guides 14 each of which is formed by a pair of spaced parallel upper and lower angle members 15, 15 which are connected together by a U-shaped plate 16. The upper ends of the guides 14 are supported in a framework 17 mounted upon a floor 18 which forms a top of the channel 10. The framework 17 includes a pair of enclosing side plates 19 which are a part of a complete housing 20 for said upper portion of the guides 14. Plates 16 also terminate adjacent said plates 19 to which the angles 15, 15 are directly connected and extend continuously as illustrated in Figs. 1 and 4 of the drawings. At its front the housing 20 is provided with a pair of swinging doors 21 (see Fig. 2), by which access is gained to the interior of said housing 20.

Mounted within the housing 20 and upon the framework 17 is a transversely extending shaft 22 carried at opposite ends in appropriate adjustable chain tensioning journal bearings 23 to which is keyed a pair of sprockets 24 in alignment with the guides 14 upon each of which sprockets 24 is mounted for driving movement an endless draft chain 25 which draft chains 25 extend into and are guided by the above mentioned guides 14. The shaft 22 is driven from an electric motor 26 mounted upon a platform 27 on the framework 17 and connected to said shaft 22 by appropriate chain and sprocket drive means 28. Extending transversely between the two draft chains 25 is one or more rakes or flights 29, there being two illustrated in Fig. 1 of the drawings, though the number may be increased or decreased, as desired, said rakes 29 being attached to said chains 25 by brackets one of which is seen at 30 in Fig. 3 of the drawings.

The bar screen 11 terminates substantially adjacent the floor 18 but continuing upwardly therefrom is a slide plate 31 over which material will slide which has been intercepted by the screen 11 and removed therefrom by the rake 29 the teeth of which extend substantially through the bars of said screen 11 and ride up close to or in contact with the slideplate 31. At a predetermined position above the floor 18 the slide plate 31 terminates with a discharge lip 32 from which the material is discharged onto a downwardly sloping receiving plate 33 within the housing 20 from which it may be raked through a hopper 34 into a receptacle 35, access thereto being reached by opening the doors 21.

It is manifest that upon driving the shaft 22 the sprockets 24 will drive the draft chains 25 along the guides 14 which will carry the rakes 29 downwardly into the channel 10 along the upper run of the chain guides 14 and downwardly onto the bottom plate 13 with the teeth thereof either in contact with said plate or only slightly spaced therefrom and interleaving the guide portions 12 of bar screen 11, thus insuring an interleaving relation between the two before a refuse accumulating area on the screen 11 is encountered which will be substantially at the forward end of said guide portions 12 or at the bottom of the bar screen 11.

The rakes or flights 29 in moving over the screen 11, which may be designated as a material collecting way, remove caught material from said screen 11 and convey it upwardly therealong and over the slide plate 31 for discharge over the lip 32.

To insure a thorough cleaning of the rake or flight 29 as it reaches the discharging position, I provide a cleaning or wiping mechanism 36 within the housing 20 at a position such that it operates automatically whenever a rake 29 comes into material discharging position, to wipe it clean. Said wiping mechanism 36 comprises a transversely extending shaft 37, opposite ends of which are pivotally journaled in bearings 38 mounted upon the side plates 19.

The outer extremities of the shaft 37 are connected to fluid cushioning devices 39 which may be either of the air or liquid type, each of which devices comprises a cylinder 40 pivotally mounted at one end on a bracket 41 carried by a plate 19 with which there is a working piston attached to a piston rod 42 pivotally attached to a swinging arm 43 which is rigidly attached to rotate with the shaft 37. The piston within the cylinder 40 is preferably provided with one or more restricted openings to permit fluid to move from one side of the cylinder to the other at a relatively slow rate as the shaft 37 rotates in a manner which is well understood. It is thus manifest that movement of the shaft 37 is cushioned and this will prevent any shock to the system which would otherwise be present when the wiper mechanism is released by a rake 29 after having performed its wiping operation.

Rigidly attached to the shaft 37 and extending transversely over the entire width of the rakes or flights 29 is a two-part wiper blade 44 comprising an upper part 45 which is rigidly attached to the shaft 37 and a lower rake contacting part 46. The bottom edge 47 is adapted to be contacted with by the upper portion of the rake 29 as said rake 29 approaches its discharge position and to move transversely across said rake 29 as said rake moves along said discharge position thereby automatically effecting a wiping of all material from said rake 29 by moving it downwardly and laterally away from said rake 29 and away from the lower runs of the draft chains 25.

The two parts 45 and 46 are pivotally and resiliently connected together to allow buckling thereof in case an obstruction is encountered by the bottom edge 47 which prevents the movement thereof across said rake 29 thus preventing any damage to the equipment. Said connecting means comprises a pair of brackets 48 which are riveted to the bottom of the upper part 45 and overlap the top of the lower part 46. In a similar manner brackets 49 are provided which are riveted to the top of the lower part 46 and overlap the bottom of the upper part 45.

Extending between the brackets 48, 48 and 49, 49 is a pivoted rod 50 which pivotally attaches the two parts 45 and 46 together. Coil springs 51, 51 surround the ends of the shaft 50 between each pair of brackets 48, 49 and have their opposite ends rigidly attached to brackets 48 and 49, respectively. The coil springs 51 are biased to maintain the parts 45 and 46 in the positions illustrated in Figs. 1, 3 and 4 of the drawings but permit pivotal movement between said two parts to effect buckling thereof under the conditions above mentioned. It is to be noted that the two parts 45 and 46 are segments of a cylinder and this construction is preferred but is not essential.

It is to be particularly noted that the entire cleaning or wiping mechanism 36 is within the housing 20 except for the cushioning devices 39. This is made possible by virtue of the fact that the shaft 37 is positioned between the upper and lower runs of the draft chains 25. Furthermore, the wiping mechanism 36 is stationary, that is, it does not rotate with the rakes. The positioning of the wiping mechanism between the upper and lower runs of the draft chains makes for a relatively simple but effective structure which not only is protected but which has a relatively small weight and which is very effective to clean the rakes or flights 29 after they reach a discharging position. In practice, it has been found that this cleaning mechanism is very efficient not only because of its total enclosure but also because of the weight thereof which is reduced to a minimum. Furthermore, the cushioning of the return movement of the wiping mechanism after it is released from a rake 29 prevents shock or jar to the equipment. Still further, the safety feature provided by the two-part buckling wiper blade 44 insures against injury to the equipment in case movement of the wiping edge 47 over a rake 29 is prevented.

In the operation of the machine comprising my invention the motor 26 drives the endless draft chains 25 which draw the rakes or flights 29 downwardly into the channel 10 with the teeth thereof first coming into interleaving relation with the guide portions 12 in contact with the plate 13 after which said rake encounters a refuse accumulating area at the bottom of the screen 11 and moves upwardly along said screen 11 or material gathering way to remove any gathering material therefrom and convey it upwardly and along the slide plate 31. As each rake or flight 29 reaches the discharge lip 32 the upper portion thereof contacts the bottom edge 47 of the wiper blade 44 which, due to its pivotal connection by the shaft 37, swings about the axis of said shaft 37, which causes said edge 47 to move laterally across said rake or flight 29 until it has moved beyond the lower edge or teeth tip thereof to effect a complete removal of any material on said rake or flight 29. Continued upward movement of the rake or flight 29 beyond a position where a plane at right angles to the direction of movement of the chains 25 pass through the axis of the shaft 37, results in the edge 47 moving backwardly over the rake or flight 29 until it is released therefrom which is substantially at the position illustrated in dotted lines at the top of Fig. 3 of the drawings. The released wiper blade 44 then swings under the influence of gravity to the full line position illustrated in Fig. 3 of the drawings, which swinging movement is cushioned by the cushioning devices 39 after which the wiper blade 44 is in position to repeat the above described wiping or cleaning operation. If during the course of movement of the bottom edge 47 over the rake or flight 29 an obstruction is encountered which prevents this ready movement, the wiper blade 44 will buckle in that the lower part 46 will pivot about the axis of the pivot rod 50 in a clockwise direction, as viewed in Fig. 3 of the drawings, against the action of the springs 51 thereby preventing any damage to any of the mechanism. After the obstruction has been cleared the springs 51 will return the parts 45 and 46 of said wiper blade 44 to their normal positions, as illustrated in Fig. 3 of the drawings.

It is thus evident that a very simple but efficient and highly protected type of wiper mechanism has been provided and one which will prevent damage to itself and to the equipment when in operation.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In sewage apparatus, the combination with a screen, of a rake for removing material therefrom, endless draft chains for moving said rake over said screen to remove refuse, said chains having upper and lower runs, and stationary pivoted rake cleaning means positioned between the upper and lower runs of said draft chains and operable to scrape material from said rake as it reaches a discharging position.

2. In sewage apparatus, the combination with a stationary frame, of a refuse accumulating way, a flight for removing refuse from said way, endless draft chains having upper and lower runs and operable to move said flight over said way to remove refuse therefrom, and wiper means pivotally mounted on an axis between said upper and lower runs and adapted to contact said flight and scrape material therefrom as said flight moves past a material discharging position.

3. In sewage apparatus, the combination with a screen, scraper means for removing material therefrom, a pivoted cleaner for said scraper, and endless draft means for said scraper, the pivotal axis of said cleaner being between the upper and lower runs of said endless draft means and above a position of the scraper when contacted by said cleaner to remove material therefrom.

4. In sewage apparatus, the combination with a material collecting way, of a flight, means for moving said flight over said way to remove material therefrom, wiper mechanism positioned in the path of said flight and mounted to contact it and move over it to wipe material therefrom, said wiper mechanism comprising a pivoted device formed in two relatively movable parts and having a flight contacting edge, and spring means between said edge and said pivotal mounting interconnecting said two parts and adapted to allow said device to buckle in case movement of said edge over said flight is prevented after which it automatically returns to its normal position.

5. In sewage apparatus, the combination with a material collecting way, of a flight, means for moving said flight over said way to remove material therefrom, wiper mechanism positioned in the path of said flight and mounted to contact it and move over it to wipe material therefrom, said wiper mechanism comprising two piece pivoted device having a flight contacting edge, and spring means connecting said two pieces between said edge and said pivotal mounting and adapted to allow it to buckle in case movement of said edge over said flight is prevented.

6. In sewage apparatus, the combination with a screen, scraper means for removing material therefrom, a pivoted cleaner for said scraper, endless draft means for said scraper, the pivotal axis of said cleaner being between the upper and lower runs of said endless draft means and above a position of the scraper when contacted by said cleaner to remove material therefrom, and fluid cushion means for cushioning the return of said cleaner after it has cleaned said scraper.

7. In sewage apparatus, the combination with a material collecting way, of a flight, means for moving said flight over said way to remove material therefrom, wiper mechanism positioned in the path of said flight and mounted to contact it and move over it to wipe material therefrom, said wiper mechanism comprising a two part pivoted device having a flight contacting edge and spring means connecting said two parts between said edge and said pivotal mounting and adapted to allow it to buckle in case movement of said edge over said flight is prevented after which it automatically returns to its normal position, and fluid cushion means for cushioning the return of said wiper mechanism after it has cleaned said flight.

8. In sewage apparatus, the combination with a screen, of a rake for removing material therefrom, a pivoted cleaner mechanism formed of a two-part arcuate body having its lower edge positioned to contact said rake as it moves to and beyond a material discharging position, the two parts of said body being resiliently connected to buckle in case movement of said edge over said rake is prevented.

9. In apparatus of the class described, the combination with a material collecting way, of a flight, means for moving said flight along said way to remove material therefrom, wiper mechanism positioned in the path of said flight and mounted to contact it and move over it to wipe material therefrom, said wiper mechanism being flexible for yielding by bending when engaging an obstruction on said flight.

10. In sewage apparatus, the combination with a screen, of a rake movable along the same, means for driving said rake, a wiper device comprising two parts pivotally and resiliently connected together, and means for mounting said wiper device to be engaged by the rake so as to cause the wiper device to move along the rake to scrape therefrom material adhering thereto, said resilient and pivotal connection enabling the wiper to buckle under strain of meeting such adhering material as forms an obstruction on said rake.

RAYMOND B. PLUMMER.